Dec. 10, 1963  R. D. PETERS  3,113,461
SIGNATURE IDENTIFICATION DEVICE
Filed Nov. 19, 1962  2 Sheets-Sheet 1
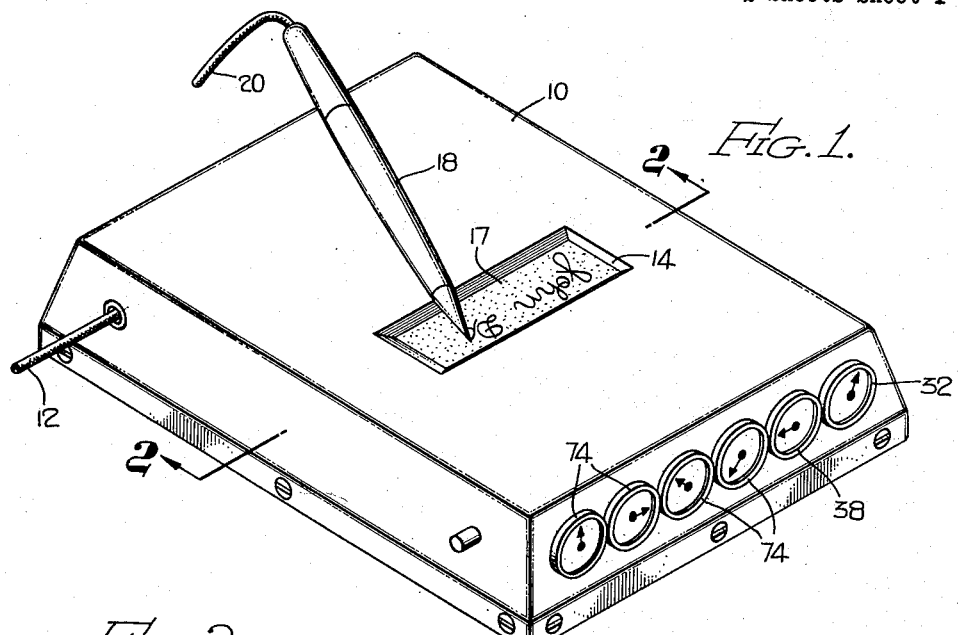
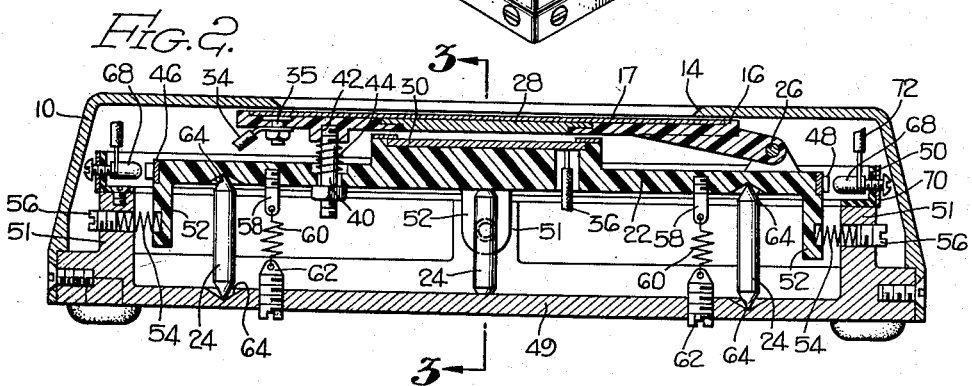
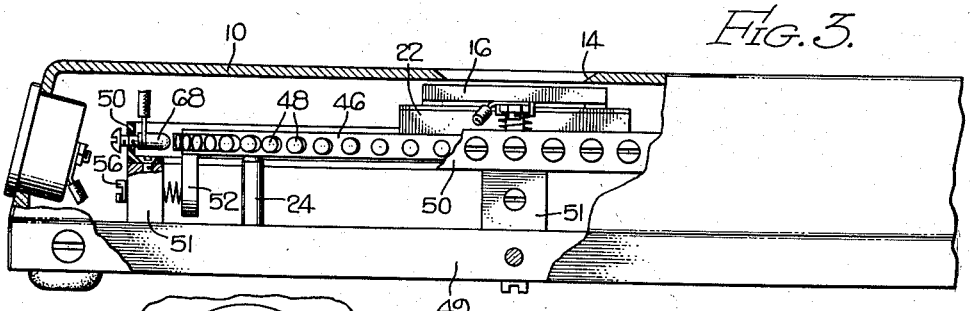
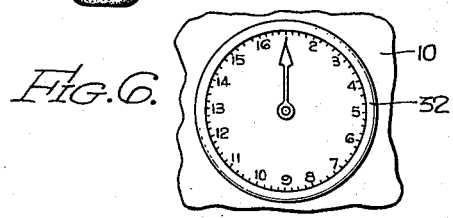
INVENTOR,
RALPH D. PETERS
BY
Lyon & Lyon
ATTORNEYS Dec. 10, 1963    R. D. PETERS    3,113,461
SIGNATURE IDENTIFICATION DEVICE
Filed Nov. 19, 1962    2 Sheets-Sheet 2
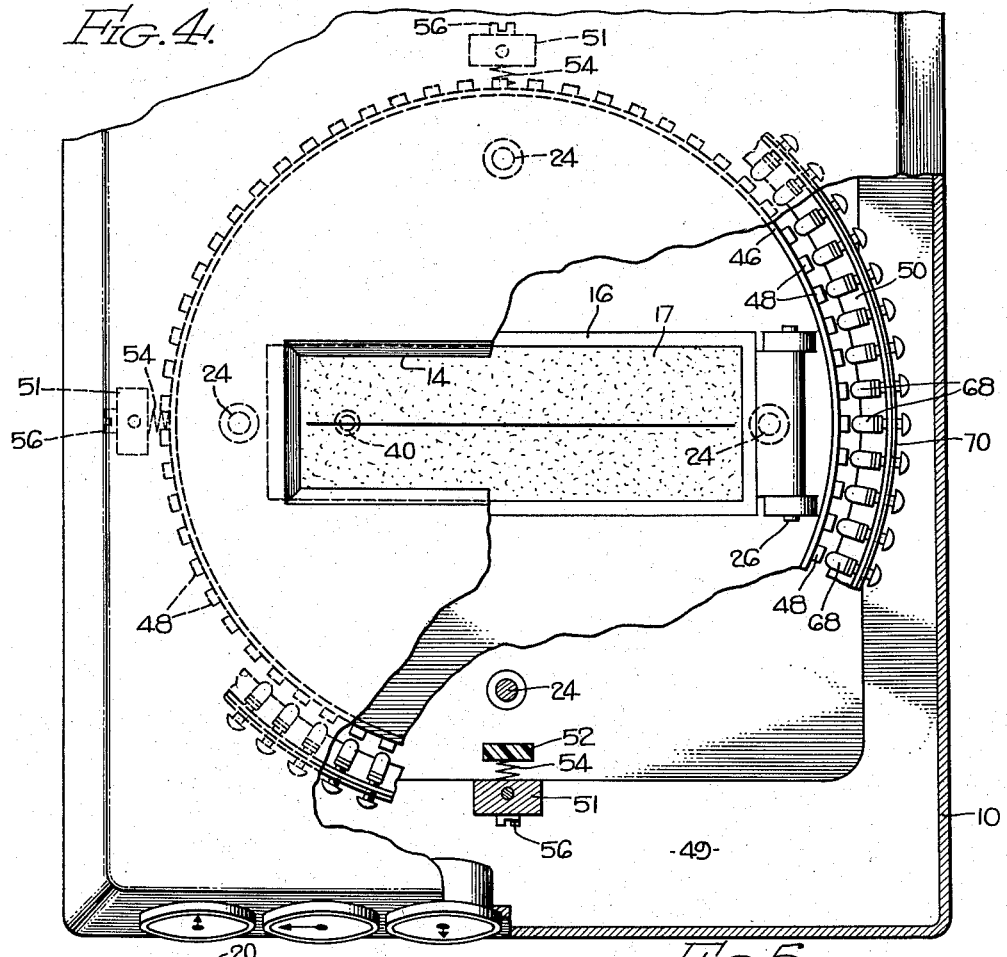
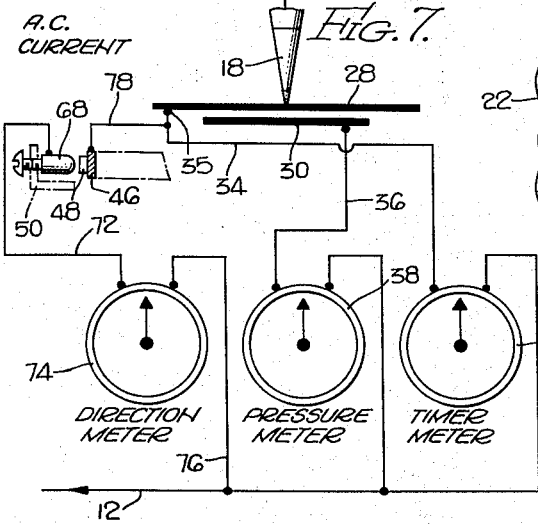
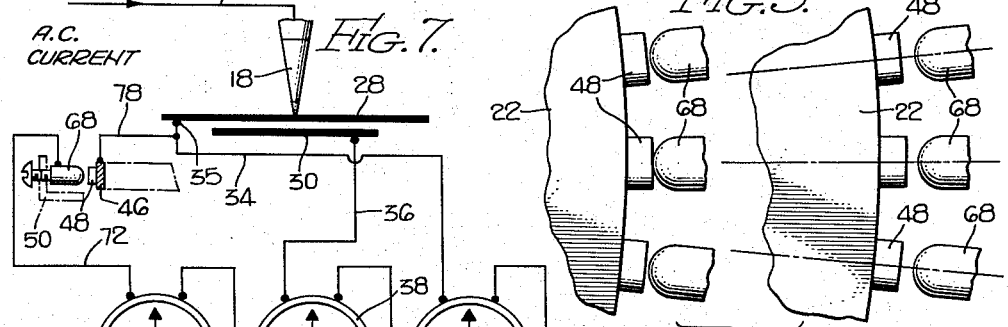
INVENTOR,
RALPH D. PETERS
BY
*Lyon & Lyon*
ATTORNEYS

# United States Patent Office 3,113,461
Patented Dec. 10, 1963

3,113,461
SIGNATURE IDENTIFICATION DEVICE
Ralph D. Peters, Los Angeles, Calif. (1481 N. Capri Drive, Pacific Palisades, Calif.), assignor of eight percent to Sam F. Booker and/or Jaenette Booker, Los Angeles, Calif.
Substituted for abandoned application Ser. No. 805,325, Apr. 9, 1959. This application Nov. 19, 1962, Ser. No. 239,107
5 Claims. (Cl. 73—432)

This invention relates to an improved signature identifying device.

In banks, stores and similar organizations which handle commercial paper such as checks, as well as in many other enterprises, it is desirable to check the signature of an individual to avoid forgery or error. In the past this checking has been principally visual which is, of course, unsatisfactory.

It is an object of this invention to provide a device which will indicate certain characteristics involved in a signature to provide an accurate comparison for additional signatures of the same individual.

It is a further object of this invention to indicate the direction and amplitude of the force applied during the course of a signature and translate these forces to a numerical code which may be preserved for future comparisons.

Other objects and advantages of this invention will be readily apparent from the following detailed description.

In the drawings:

FIGURE 1 is a perspective of a device embodying this invention.

FIGURE 2 is a view taken along the line 2—2 of FIGURE 1.

FIGURE 3 is a view taken along line 3—3 of FIGURE 2.

FIGURE 4 is a top plan view with certain parts broken away.

FIGURE 5 is a diagrammatic view of the contacts.

FIGURE 6 is a plan view of one of the indicating instruments.

FIGURE 7 is a wiring diagram.

A casing 10 is provided housing the instrument and has an electrical inlet 12 and a window 14. Supported on bed 16 is a sheet of paper 17 which is electrically conductive and upon which the signature being tested is impressed by pen 18 which has the remaining electrical conductor 20 attached thereto.

Bed 16 is supported in turn upon floating plate 22 which is mounted upon four equally spaced apart spindles 24. The bed is pivotally mounted at one extremity to plate 22 as at 26. Bed 16 on its under surface carries a capacitor plate 28 while the second capacitor plate 30 is mounted upon floating plate 22.

When the pen 18 contacts the electrically conductive paper 17 it completes two circuits. The timer circuit includes a meter 32 which along with the other meters is mounted in a face of casing 10. A wire such as 34 is connected between one side of meter 32 and terminal 35 which in turn contacts conductive paper 17 completing a circuit between inlet 12 and conductor 20. The meter is any suitable instrument for measuring a time interval and registers the interval elapsing while the circuit is closed, that is, measuring the time necessary for writing of a signature, giving the interval a suitable numerical designation on a dial face similar to that seen in FIGURE 4.

The second circuit closed upon contact of pen 18 with paper 17 is through capacitor plates 28 and 30 and wire 36 and pressure meter 38 completing the circuit between inlet 12 and conductor 20 of the alternating current supplied from any suitable source. Meter 38 is likewise calibrated in numerals and registers a shift in plate relative to plate 30 thereby varying the impedance in the circuit.

The bed 16 and floating plate 22 are of a suitable electrically non-conductive material and plate 22 has mounted thereon a pin 40 which projects into recess 42 in bed 16. A spring 44 surrounds pin 40 and resists pivoting of bed 16 and upon removal of pressure thereon by pin 18 restores same to its normal position.

Mounted upon the periphery of circular floating plate 22 is an electrically conductive ring 46 which carries a plurality of equally spaced apart contacts 48.

Casing 10 has a bottom cover 49 removably mounted thereon by set screws which cover has mounted thereon a ring 50 supported upon legs 51 which ring surrounds floating plate 22.

Plate 22 has four equally spaced downwardly projecting studs 52 thereon each of which has a recess receiving one extremity of a spring such as 54, the remaining end of which seats in a recess in legs 51. These four springs center plate 22 with respect to ring 50 and the spring force may be adjusted by a set screw such as 56. Plate 22 likewise has four lugs 58 to each of which a spring 60 is attached at one end while the other end of the spring is attached to a lug 62 in cover 49. Each spindle 24 has its sharpened extremities in a suitable recess such as 64 in plate 22 and cover 49, thus permitting movement of plate 22 towards circular flange 50 in any direction.

Ring 50 is of a suitable electrically non-conductive material. Mounted in ring 50 are contacts 68, one for each contact 48 and spaced apart to oppose contacts 48. When the writer impresses his signature on paper 17 the force he applies will move floating plate 22 with respect to ring 50 until one of the contacts 48 engages one of the contacts 68 as seen in the left hand view of FIGURE 3. The contacts 68 in ring 50 are divided into quadrants and the contacts in each quadrant are electrically interconnected and each contact in a quadrant has a different electrical resistance from each other contact in its quadrant. The contacts may be interconnected by a suitable metal strip 70. The circuitry for each quadrant is the same. A wire 72 is connected to one of the contacts and to a suitable meter 74 which is connected through wire 76 to inlet 12. The contacts 48 are interconnected electrically by ring 46 which is electrically connected by a suitable wire 78 to terminal 35. Thus, upon movement of floating plate 22 one of the contacts 48 will engage one of the contacts 68 closing the circuit to meter 74. The resistance of the particular contact 68 will determine the numerical reading of the meter.

There is provided a meter for each quadrant so that the movement of plate 22 in any direction will be registered upon one of the direction meters such as 74 and given a numerical denomination thereon.

In this manner as a signature is recorded upon paper 17 the timer will give a numerical designation as will the pressure meter and one or more of the direction meters. These numbers form the basis of a code which may be recorded and compared with the signature the next time it is desired to check for forgery. A certain tolerance will be necessary in the comparison thus made; however, the underlying characteristics of a signature will be readily apparent for the comparison.

While what hereinbefore has been described as the preferred embodiment of this invention, it is readily apparent that alterations and modifications may be resorted to without departing from the scope of this invention and such alterations and modifications are intended to be included within the scope of the appended claims.

What is claimed is:

1. A signature identifying device comprising: an electrically conductive paper; an electrically conductive pen; means supporting said paper for universal movement in a plane; a plurality of meters; at least one of said meters being in an electrical circuit including said paper and said pen so that contact between said pen and paper completes a circuit through said meter; said meter including timing means to indicate thereon the time duration of contact between said pen and paper; means responsive to the force applied by said pen upon said paper, being electrically connected with another of said meters in a second circuit completed by contact of said pen with said paper, whereby said other meter indicates said force; a further circuit completed by contact of said pen with said paper and including a further meter and means responsive to movements of said paper in said plane to indicate, on said further meter, the direction of movement of said paper in said plane.

2. A device as defined in claim 1 wherein said means responsive to movements of said paper comprise a plurality of contacts on said means supporting said paper; a fixed contact adjacent each of said plurality of contacts and arranged so that a different pair of adjacent contacts is closed for each different direction of movement of said supporting means.

3. A signature identifying device comprising: an electrically conductive paper; an electrically conductive pen; means movably mounting said paper; a plurality of meters; circuit means for completing a circuit through each of said meters upon contact of said pen with said paper; means in the circuits of certain of said meters for sensing respectively different components of movement of said paper induced by said pen whereby said components are indicated on respective ones of said certain meters; another of said meters including timing means whereby said other meter indicates the time duration of contact between said pen and paper.

4. A device as defined in claim 3 wherein the sensing means for at least one of said meters senses the component of movement transmitted from said pen to said paper generally perpendicular to the plane of said paper.

5. A device as defined in claim 3 wherein certain of said sensing means sense the directional components of the movement applied by said pen to said paper in directions generally parallel to the plane of said paper and wherein the sensing means for said at least one meter comprises a variable capacitor responsive to said movement transmitted to said paper by said pen generally perpendicular to the plane of said paper.

References Cited in the file of this patent

UNITED STATES PATENTS

| | | |
|---|---|---|
| 1,323,058 | Hughes | Nov. 25, 1919 |
| 2,148,567 | Marchant et al. | Feb. 28, 1939 |
| 2,294,149 | Kline et al. | Aug. 25, 1942 |
| 2,346,670 | Engler et al. | Apr. 18, 1944 |
| 2,667,786 | Spaulding | Feb. 2, 1954 |
| 2,805,677 | Baird | Sept. 10, 1957 |